United States Patent
Baker et al.

(10) Patent No.: US 9,709,662 B2
(45) Date of Patent: Jul. 18, 2017

(54) SYSTEMS AND METHODS FOR DETERMINING A POSITION OF A TRANSMITTER OF A BISTATIC RADAR SYSTEM

(71) Applicant: The Boeing Company, Chicago, IL (US)

(72) Inventors: James Bryan Baker, Covington, WA (US); Gary Alan Ray, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 339 days.

(21) Appl. No.: 14/461,579

(22) Filed: Aug. 18, 2014

(65) Prior Publication Data

US 2016/0047883 A1    Feb. 18, 2016

(51) Int. Cl.
  *G01S 13/00*  (2006.01)
  *G01S 5/02*   (2010.01)
  *G01S 3/02*   (2006.01)

(52) U.S. Cl.
  CPC .......... *G01S 5/0273* (2013.01); *G01S 13/003* (2013.01); *G01S 3/02* (2013.01)

(58) Field of Classification Search
  CPC ......... G01S 13/003; G01S 3/02; G01S 5/0273
  USPC ....................................................... 342/126
  See application file for complete search history.

(56) References Cited

U.S. PATENT DOCUMENTS

| | | | |
|---|---|---|---|
| 3,939,476 A |   | 2/1976 | Leopard |
| 4,670,757 A |   | 6/1987 | Munich |
| 4,746,924 A |   | 5/1988 | Lightfoot |
| 4,980,690 A |   | 12/1990 | Fiden |
| 5,280,294 A | * | 1/1994 | Hammerquist ........... G01S 3/52 342/125 |
| 5,327,145 A | * | 7/1994 | Jelinek ...................... G01S 5/10 342/126 |
| 6,608,593 B2 | * | 8/2003 | Holt .......................... G01S 5/02 342/450 |
| 2013/0106645 A1 | * | 5/2013 | Goodson ............... G01S 13/003 342/29 |

OTHER PUBLICATIONS

Extended European Search Report for EP 15181425.8-1812 dated Dec. 1, 2015.

* cited by examiner

*Primary Examiner* — Timothy A Brainard
(74) *Attorney, Agent, or Firm* — Joseph M. Butscher; The Small Patent Law Group, LLC

(57) ABSTRACT

A bistatic radar system may include a transmitter, a target at a first known position, a receiver at a second known position, and a transmitter position determination unit. The receiver is configured to receive one or more reflected radar signals transmitted from the transmitter and reflected off the target. The receiver is configured to receive one or more direct radar signals transmitted from the transmitter. The transmitter position determination unit is configured to determine a position of the transmitter based on a determination of a distance between the first and second known positions and a determination of a first angular difference between the reflected radar signal(s) and the direct radar signal(s) that are received by the receiver.

21 Claims, 6 Drawing Sheets

SYSTEMS AND METHODS FOR DETERMINING A POSITION OF A TRANSMITTER OF A BISTATIC RADAR SYSTEM

BACKGROUND OF THE DISCLOSURE

Embodiments of the present disclosure generally relate to radar systems and methods.

Radio detection and ranging (radar) systems generally use radio waves to determine a range, altitude, direction and/or speed of objects. Radar systems may be used to detect aircraft, ships, vehicles, guided missiles, weather, terrain, and the like. In general, a radar transmitter or illuminator includes an antenna that transmits pulses of radio waves or microwaves that encounter and reflect off an object. A portion of the energy of the reflected wave is received by an antenna of a radar receiver.

In a monostatic radar system, the transmitter and receiver are located at the same position (that is, collocated). In contrast, a bistatic radar system includes a transmitter and a receiver at separate and distinct positions. For example, the transmitter and receiver of a bistatic radar system may be separated by hundreds of miles.

In order for a bistatic radar system to operate, the locations of both the transmitter and the receiver are known, whether or not either is moving. For example, in airborne applications, if both the transmitter and the receiver are moving (such as when onboard aircraft), the positions of both the transmitter and the receiver are frequently updated. Once the positions of the transmitter and the receiver are known, the positions of unknown targets with the range of the radar system may be determined.

As can be appreciated, in order for a known bistatic radar system to properly function, the transmitter and the receiver communicate with one another or a remote control center in order to provide position information. As such, the transmitter and the receiver cooperate with one another in such a known bistatic radar system. However, providing a communication system between the transmitter and the receiver increases the cost and complexity of a radar system. Further, if the communication system malfunctions or is inoperative, the entire radar system is also inoperative.

Additionally, if the transmitter and the receiver are controlled by separate and distinct entities, the system may not be able to operate. For example, a radar transmitter may be onboard an aircraft controlled or controlled by a first entity, such as a government, while a radar receiver may be onboard an aircraft controlled or owned by a separate and distinct entity that may or may not be cooperative or friendly with the first entity. In such a scenario, the transmitter may not communicate with the receiver, thereby preventing the receiver from utilizing a bistatic radar system that includes the transmitter.

SUMMARY OF THE DISCLOSURE

Certain embodiments of the present disclosure provide a bistatic radar system that may include a transmitter at an initially unknown position, a target at a first known position, a receiver at a second known position, and a transmitter position determination unit. The receiver is configured to receive (a) one or more reflected radar signals transmitted from the transmitter and reflected off the target, and (b) one or more direct radar signals transmitted from the transmitter. The transmitter position determination unit is configured to determine a position of the transmitter based on a determination of a distance between the first and second known positions and a determination of a first angular difference between the one or more reflected radar signals and the one or more direct radar signals that are received by the receiver. Each of the transmitter, the target, and the target may be moving or fixed in position.

In at least one embodiment, the transmitter refrains from communicating the position of the transmitter. In at least one embodiment, the receiver includes the transmitter position determination unit.

The transmitter position determination unit may be configured to determine a bistatic range difference by measuring a time difference between a first time ($T_1$) when the reflected radar signal(s) or the direct radar signal(s) are received by the receiver and a second time ($T_2$) when the other of the reflected radar signal(s) or the direct radar signal(s) are received by the receiver. The transmitter position determination unit may be configured to convert the time difference to the bistatic range difference by multiplying the time difference by the speed of light.

The transmitter may be separated from the target by a first linear distance ($S_1$). The transmitter may be separated from the receiver by a second linear distance ($S_2$). The receiver may be separated from the transmitter by a third linear distance ($S_3$). The transmitter position determination unit may be configured to relate the first, second, and third distances to the first and second times as $S_1+S_2-S_3=C*(T_1-T_2)$, wherein C is the speed of light. The transmitter position determination unit may be configured to determine $K=S_1-S_3$, such that $K=C*(T_1-T_2)-S_2$. The transmitter position determination unit may be configured to determine the third distance as $S_3=(S2^2-K^2)/(2S_2 \cos \theta_1+2K)$. A determination of the third distance $S_3$ provides the position of the transmitter.

In at least one embodiment, the transmitter position determination unit may be configured to determine a second angular difference between a main beam transmitted from the transmitter towards the target and a sidelobe transmitted from the transmitter toward the receiver. The transmitter position determination unit may use the second angular difference to determine an accuracy of the determined position of the transmitter.

The transmitter position determination unit may also be configured to determine one or both of a first elevation of the transmitter relative to the receiver or a second elevation of the target relative to the receiver.

Certain embodiments of the present disclosure provide a bistatic radar method that may include providing target position data indicative of a first position of a target to a transmitter position determination unit, providing receiver position data indicative of a second position of a receiver to the transmitter position determination unit, receiving, with the receiver, one or more reflected radar signals transmitted from a transmitter and reflected off the target, receiving, with the receiver, one or more direct radar signals transmitted from the transmitter, and determining a third position of the transmitter, with the transmitter position determination unit, based on a distance between the first and second positions and a first angular difference between the reflected radar signal(s) and the direct radar signal(s).

Certain embodiments of the present disclosure provide a bistatic radar system that may include a transmitter position determination unit configured to determine a position of a transmitter based on a determination of a distance between first and second known positions of a target and a receiver, respectively, and a determination of a first angular difference between (a) one or more reflected radar signals reflected off the reflector and received by the receiver and (b) one or more direct radar signals directly received by the receiver.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide systems and methods of determining a position of a transmitter of a bistatic radar system. The transmitter may refrain from communicating with a receiver. For example, the transmitter and the receiver may not communicate position information with one another. Instead, the systems and methods of the present disclosure are configured to determine the location or position of the transmitter by detecting radar signals transmitted by the transmitter.

Figure 1:
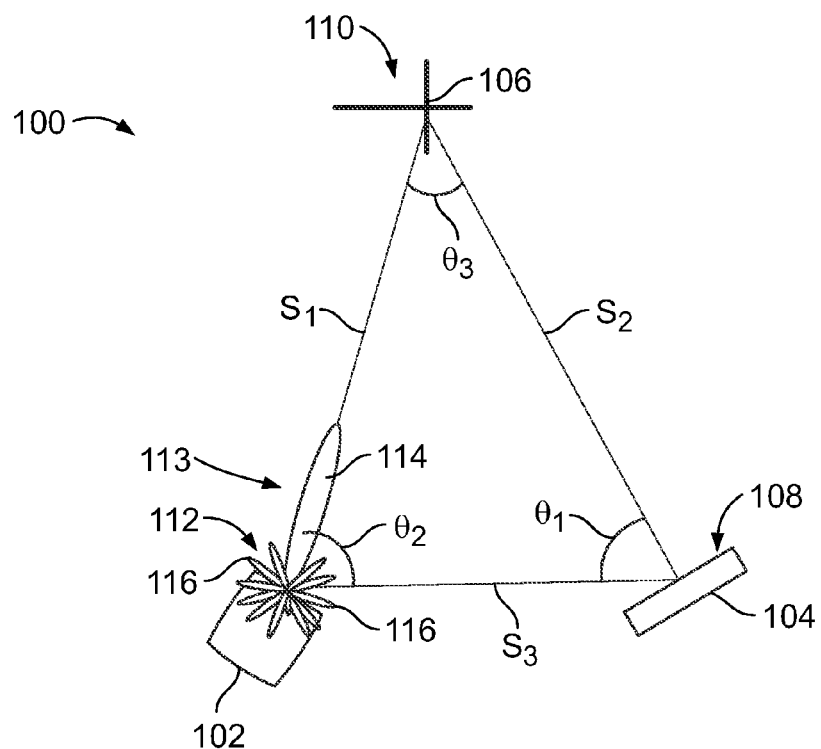
FIG. 1 illustrates a simplified schematic diagram of a bistatic radar system, according to an embodiment of the present disclosure.

FIG. 1 illustrates a simplified schematic of a bistatic radar system 100, according to an embodiment of the present disclosure. The bistatic radar system 100 includes a transmitter or illuminator 102 that is separated from a receiver 104. The transmitter 102 and the receiver 104 may be separated by any distance, which may or may not be a fixed distance. For example, one or both of the transmitter 102 and the receiver 104 may be onboard air, land, sea, or space vehicles that move. Optionally, one or both of the transmitter 102 and the receiver 104 may be at fixed locations, such as within buildings at fixed locations on land, or under water, and the like.

The bistatic radar system 100 also includes a target 106. The target 106 may be a moving or fixed object, vehicle, landmark, monument, terrain feature, or the like. As shown in FIG. 1, the target 106 may be an aircraft.

The positions of the receiver 104 and the target 106 are known. For example, the receiver 104 is at a first known position 108, which may be on or in land, sea, or air, while the target 106 is at a second known position 110, which may differ from the first known position 108. In contrast, the transmitter 102 is at an initially unknown position 112, which may on or in land, sea, or air.

The positions of the receiver 104 and the target 106 may be known through various systems and methods. For example, each of the receiver 104 and the target 106 may include global position system (GPS) units or devices that determine the respective positions. The receiver 104 and the target 106 may be in communication with one another, such as through dedicated wireless links, voice communication links (for example, an individual at each position may call in the position data), or the like, so that the target 106 may continually communicate its position to the receiver 104.

As shown, the transmitter 102 is separated from the target 106 by a distance $S_1$, which is an initially unknown distance. The target 106 is separated from the receiver 104 by a distance $S_2$, which is a known distance. The receiver 104 is separated from the transmitter 102 by a distance $S_3$, which is an initially unknown distance. The angle between $S_2$ and $S_3$ is $\theta_1$. The angle between the $S_1$ and $S_3$ is $\theta_2$. The angle between $S_1$ and $S_2$ is $\theta_3$.

In operation, the transmitter 102 transmits one or more radar signals 113, which may include a main beam 114 and sidelobes 116. At least portions of the main beam 114 and/or the sidelobes 116 are reflected off the target 106 and received by the receiver 104.

Figure 2:
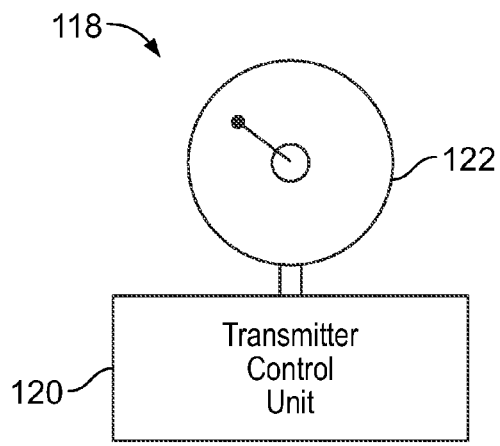
FIG. 2 illustrates a simplified schematic diagram of a bistatic radar transmitter, according to an embodiment of the present disclosure.

FIG. 2 illustrates a simplified schematic diagram of a bistatic radar transmitter 118, according to an embodiment of the present disclosure. The transmitter 118 is an example of the transmitter 102, shown in FIG. 1. The transmitter 118 may include a transmitter control unit 120 operatively connected to a signal generator 122, such as an antenna, dish, or the like. The transmitter control unit 120 may be or include one or more processors, circuits, modules, or the like that are configured to control operation of the transmitter 118. For example, the transmitter control unit 120 may control a radar signal transmitted from the signal generator 122.

The transmitter 118 may transmit pulsed radar signals, which may include the main beam 114 and the sidelobes 116. For a high pulse repetition frequency (PRF) radar, multiple coherent processing intervals (CPIs) that have different PRFs may be used to disambiguate range using the Chinese Remainder Theorem or other such technique.

In at least one embodiment, the transmitter 102 (shown in FIG. 1) may include the signal generator 122, which may be a slowly rotating (for example, a period of 10 seconds) antenna or dish. The signal generator 122 may rotate at a regular and predictable speed. Accordingly, the angle $\theta_1$ may be determined by determining a time difference between the reception of the reflected radar signals from the target 106, and the direct reception of the incident radar signals from the transmitter 102.

Figure 3:
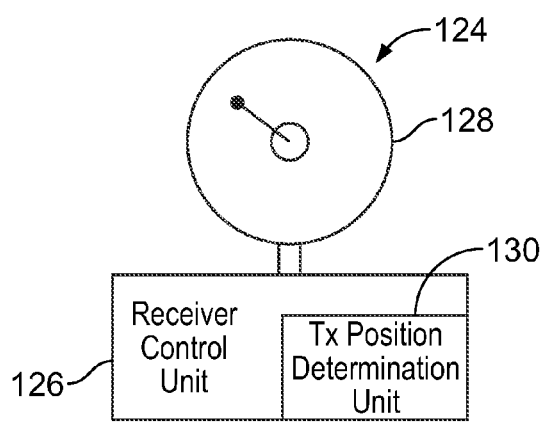
FIG. 3 illustrates a simplified schematic diagram of a bistatic radar receiver, according to an embodiment of the present disclosure.

FIG. 3 illustrates a simplified schematic diagram of a bistatic radar receiver 124, according to an embodiment of the present disclosure. The receiver 124 is an example of the receiver 104, shown in FIG. 1. The receiver 104 may include a receiver control unit 126 operatively connected to a signal-receiving structure 128, such an antenna or dish. The signal-receiving structure 128 may be pointed at the known position 110 of the target 106. The receiver control unit 126 may be or include one or more processors, circuits, modules, or the like that are configured to control operation of the receiver 124. For example, the receiver control unit 126 may analyze radar signals received through the signal-receiving structure 128. The signal-receiving structure 128 may be fixed with respect to a platform or main housing of the receiver 124. Receive antenna beams of the signal-receiving structure 128 may be electronically steered.

The receiver 124 may also include a transmitter position determination unit 130, which may include one or more processors, circuits, modules, or the like. The transmitter position determination unit 130 may be part of the receiver control unit 126. Optionally, the transmitter position determination unit 130 may be separate and distinct from the receiver control unit 126. For example, the transmitter position determination unit 130 may be housed within the receiver 124 and in communication with the receiver control unit 126. Alternatively, the transmitter position determination unit 130 may be separate and distinct from the receiver 124. For example, the transmitter position determination unit 130 may be positioned at a separate and distinct location from the receiver 124, and in communication with the receiver control unit 126. The transmitter position determination unit 130 is configured to receive one or more radar signals and determine the position of the transmitter 102, as explained below.

The receiver 104 (shown in FIG. 1) may include the signal-receiving structure 128, which may be or otherwise include a directional antenna or dish pointed toward the target 106. For example, the directional antenna of the receiver 104 may include multiple beams, or may be scanned with a single beam.

In at least one embodiment, the transmitter position determination unit 130 may determine a bistatic range difference by measuring a time difference between a reception of direct pulses from radar sidelobes 116 and reflected pulses from the target 106. The transmitter position determination unit 130 may convert the time difference to a range difference by multiplying the time difference by the speed of light.

Referring to FIGS. 1-3, the transmitter position determination unit 130 may determine the angle $\theta 1$ based on radar signals received by the receiver 104. For example, the signal-receiving structure 128 may be a directional antenna (such as a digitally-steered beamformer) that receives at least a portion of the main beam 114 or a sidelobe 116 reflected off the target 106, and at least a portion of the main beam 114 or a sidelobe 116 transmitted from the transmitter 102.

The transmitter position determination unit 130 may analyze the received signals and determine the difference between the reception angles of the received signals in relation to the signal-receiving structure 128. The difference between the reception angles of the two separate signals (for example, at least a portion of the main beam 114 reflected off the target 106 and at least a portion of a sidelobe 116) provides the angle $\theta_1$.

The position determination unit 130 may determine the relative position of the transmitter 102 with respect to the receiver 104 by analyzing, at least in part, reflected radar signals (such as reflected portions of the main beam 114 and/or the sidelobes 116) from the target 106. The position determination unit 130 may also analyze direct or incident radar signals (such as direct or incident portions of the main beam 114 and/or the sidelobes 116) transmitted from the transmitter 102. For example, the receiver 104 receives reflected radar signals from the target 106 along the distance $S_2$, which is a known distance. The receiver 104 also receives direct or incident radar signals from the transmitter 102 along the distance $S_3$. The position determination unit 130 analyzes the received reflected and direct radar signals to determine the angle $\theta_1$, such as through an analysis of the angle of reception by the antenna or dish of the receiver 104, as described above. The position determination unit 130 then determines the distance $S_3$, and therefore the position 112, based on the known distance $S_2$ and the angle $\theta_1$, as described below.

The transmitter position determination unit 130 determines the distance $S_2$, by comparing the known position of the receiver 104 with the known position of the target 106. For example, the transmitter position determination unit 130 may subtract the known position 110 of the target 106 from the known position 108 of the receiver 104 to determine the distance S2. The transmitter position determination unit 130 then proceeds to determine $S_3$, and thus the position 113 of the transmitter 102, as described below.

The receiver 104 may receive a reflected radar signal from the target 106 at a first time $T_1$. The receiver 104 may also receive a direct or incident signal from the transmitter 102 at a second time $T_2$ that differs from the first time. The first time $T_1$ may precede the second time $T_2$, or vice versa. The reflected radar signal may include at least a portion of the main beam 114 reflected off the target 106. Alternatively, the reflected radar signal may include at least a portion of a sidelobe 116 reflected off the target 106. The direct or incident signal may include at least a portion of a sidelobe 116 directly transmitted from the transmitter 102 along the linear distance $S_3$. Alternatively, the direct or incident signal may include at least a portion of the main beam 114 directly transmitted from the transmitter 102 along the linear distance $S_3$. The distances $S_1$, $S_2$, and $S_3$ relate to the times $T_1$ and $T_2$ as follows:

$$S_1 + S_2 - S_3 = C^*(T_1 - T_2) \quad \text{(Equation 1)}$$

where C is the speed of light.

A value K may be determined as follows:

$$K = S_1 - S_3 \quad \text{(Equation 2)}$$

K may be determined based on the known or measured values for C, $T_1$, $T_2$, and $S_2$, such that $$K = C^*(T_1 - T_2) - S_2 \quad \text{(Equation 3)}$$

As noted, the distance $S_2$ is known because it is the distance between the known positions 110 and 108.

The distance $S_3$ may then be determined as follows:

$$S_3 = (S_2^2 - K^2)/(2S_2 \cos\theta_1 + 2K) \quad \text{(Equation 4)}$$

As described above, the transmitter position determination unit 130 is able to determine the angle $\theta_1$. Further, the transmitter position determination unit 130 knows or otherwise determines the distance $S_2$ based on the known positions 108 and 110 of the receiver 104 and the target 106, respectively. By knowing the distance $S_2$, and determining the angle $\theta_1$, the transmitter position determination unit 130 is able to determine the distance $S_3$, and thus the position 112.

Once the transmitter position determination unit 130 determines the position 112 of the transmitter 102, the receiver control unit 126 may then determine the position of all unknown target positions within the range of the bistatic radar system 100. Accordingly, embodiments of the present disclosure provide a system and method of determining the position of the transmitter 102, even if the transmitter 102 is not in communication with the receiver 104. By knowing the positions 108 and 110 of the receiver 104 and the target 106, respectively, the transmitter position determination unit 130 determines the distance $S_2$ therebetween. Further, the receiver 104 determines the angle $\theta_1$ by receiving at least a portion of the main beam 114 (or a sidelobe 116) reflected off the target 106, and at least another portion of the main beam 114 and/or a sidelobe 116 directly from the transmitter 102. The transmitter position determination unit 130 then determines the distance $S_3$ and thus the position 112 of the transmitter 102 based on the determination of $S_2$ and the angle $\theta_1$.

The transmitter position determination unit 130 is configured to determine the position 112 of the transmitter 102 even if the receiver 104 and/or the target 106 communicate with the transmitter 102. By not communicating with the transmitter 102, the bistatic radar system 100 may operate during times, such as during military missions or operations, when a communication link between the transmitter 102 and the receiver 104 is impractical and/or threatening to an objective. For example, an enemy combatant may intercept communications over a communication link. Further, the bistatic radar system 100 may be used even if the transmitter 102 is uncooperative (for example, refuses to communicate its position) with the receiver 104.

As noted, the transmitter 102 may include the signal generator 122, which may be or otherwise include a spinning radar member, such as an antenna or dish. For a spinning radar member with constant rotational speed, by measuring the radar rotational speed and determining the difference between the time when the main beam 114 points at the receiver 104 and the time when the reflected signal from the target 106 is received by the receiver 104, the angle $\theta_2$ may be determined. As such, the additional determination of the angle $\theta_2$ may be used to check the accuracy of the determination of the position of the transmitter 102. For example, the transmitter position determination unit 130 may be supplied with data regarding the rotational speed of the spinning radar member of the transmitter 102. As an example, the spinning radar member may make a full 360 degree rotation every 10 seconds. The transmitter position determination unit 130 may also detect when the main beam 104 points at the receiver 104 and when the radar signal is received as a reflected signal from the target 106. As such, the transmitter position determination unit 130 may then determine the angle $\theta_2$. The transmitter position determination unit 130 may then determine whether the distances $S_1$, $S_2$, and $S_3$ are in agreement based on the angle $\theta_1$, which the transmitter determination unit 130 knows, the angle $\theta_2$, which the transmitter determination unit 130 has determined, and the angle $\theta_3$, which the transmitter position determination unit 130 may determine by subtracting $\theta_1+\theta_2$ from 180 degrees. If the distances $S_1$, $S_2$, and $S_3$ are in agreement with a triangle having such angles, then the accuracy of the distance $S_3$ may be confirmed. If, however, the distances $S_1$, $S_2$, and $S_3$ are not in agreement with a triangle having such angles, then the transmitter position determination unit 130 may transmit an alert message that the distance $S_3$ (and therefore the determined location 112) may be inaccurate.

Equations 1-4 described above provide 2 dimensional equations that are configured to determine the geometry of a triangle. However, Equations 1-4 may not determine the orientation of the triangle in 3-dimensional space alone. The locations of two of the three vertices of the triangle may be hypothetically determined. The location of the third unknown vertex may not be hypothetically determined. To determine the location of the third vertex, the altitude of the vertex relative to the receiver 104 may be known. The antenna of the receiver 104 may be used to determine the elevation angle.

Figure 4:
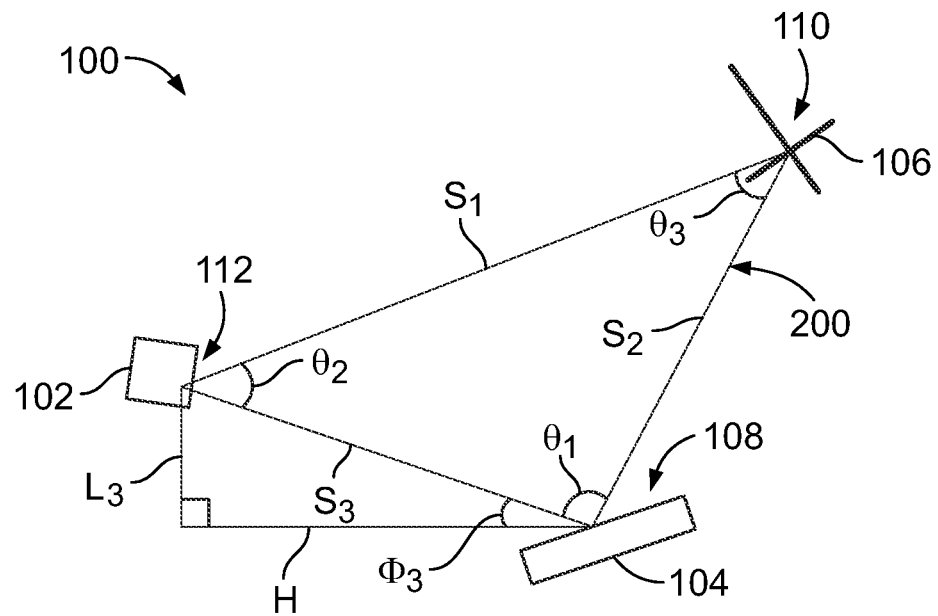
FIG. 4 illustrates a simplified schematic diagram of a bistatic radar system, according to an embodiment of the present disclosure.

FIG. 4 illustrates a simplified schematic diagram of the bistatic radar system 100, according to an embodiment of the present disclosure. In FIG. 4, the positions 108 and 110 of the receiver 104 and the target 106, respectively, may be known, while the position 112 of the transmitter 102 is unknown. The distances $S_1$, $S_2$, and $S_3$, and the angles $\theta_1$, $\theta_2$, and $\theta_3$ may be determined, as described above. Notably, the distances $S_1$, $S_2$, and $S_3$ and the angles $\theta_1$, $\theta_2$, and $\theta_3$ reside within a plane 200 defined by the positions 108, 110, and 112.

To determine an elevation of the transmitter 102 relative to the receiver 104, the transmitter position determination unit 130 may determine an elevation angle $\Phi$ as detected by an antenna of the receiver 104. The altitude of the transmitter 102 relative to the receiver 104 may then be determined as follows:

$$L_3 = S_3 \sin \Phi_3 \quad \text{(Equation 5)}$$

where $L_3$ is the vertical distance from a horizontal plane H in which the receiver 104 resides to the position 112, and S3 is determined through Equation 3. Once the position 112 and altitude $L_3$ of the transmitter 102 have been determined, such as by the transmitter position determination unit 130 (shown in FIG. 3), positions of unknown targets may be detected in 3-dimensional space.

Figure 5:
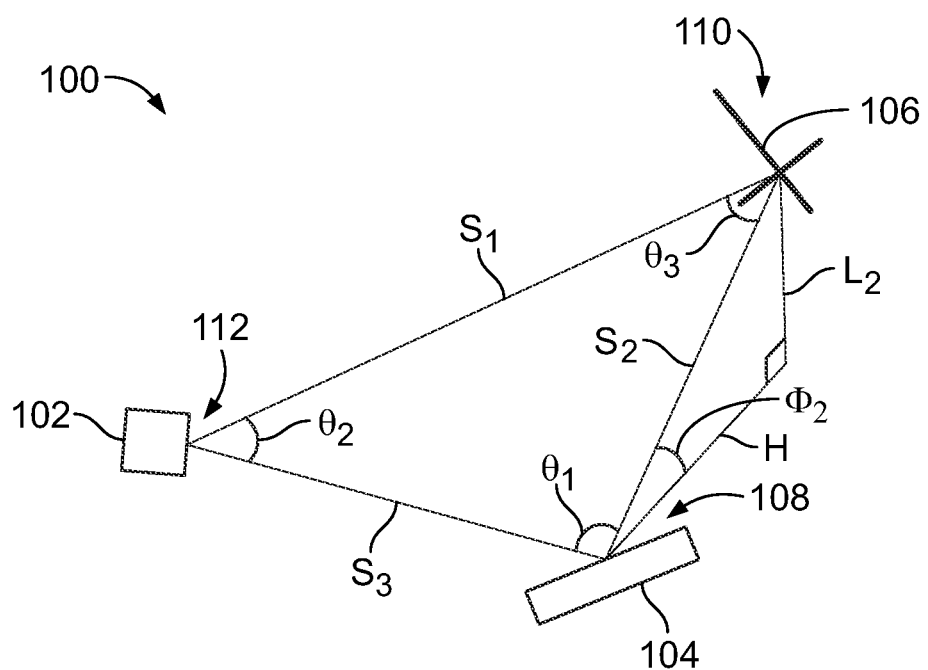
FIG. 5 illustrates a simplified schematic diagram of a bistatic radar system, according to an embodiment of the present disclosure.

FIG. 5 illustrates a simplified schematic diagram of the bistatic radar system 100, according to an embodiment of the present disclosure. As shown in FIG. 5, the positions 108 and 112 are known (such as through Equations 1-3), but the elevation $L_2$ of the target 106 may be unknown. To determine the elevation $L_2$ of the target 106 relative to the receiver 104, the transmitter position determination unit 130 may determine the elevation angle $\Phi$ as detected by an antenna of the receiver 104. The elevation or altitude of the target 106 relative to the receiver 104 may then be determined as follows:

$$L_2 = S_2 \sin \Phi_2 \quad \text{(Equation 6)}$$

where $L_2$ is the vertical distance from a horizontal plane H in which the receiver 104 resides to the position 110, and $S_2$ is known, as described above.

Referring to FIGS. 1-5, the bistatic radar system 100 may continually monitor the positions of the receiver 104 and the target 106 and continually update the determination of the position of the transmitter 102. For example, the transmitter position determination unit 130 may update position data regarding the receiver 104 and the target 106 and determine the position of the transmitter 102 once every X number of seconds. For example, position data for the receiver 104 and the target 106 may be received by the transmitter position determination unit 130 every five seconds, and the transmitter position determination unit 130 may determine the position of the transmitter 102 accordingly (such as every five seconds). It is to be understood, however, that the updating period may be greater or lesser than five seconds. If the bistatic radar system 100 is configured to detect the positions of fast moving aircraft, for example, the updating period may be shorter than if the bistatic radar system 100 is configured to detect the positions of slower moving watercraft.

Any of the transmitter 102, the receiver 104, and the target 106 may be fixed or mobile. For example, the transmitter 102, the receiver 104, or the target 106 may be positioned within an aircraft, land vehicle, watercraft, spacecraft, or the like.

Figure 6:
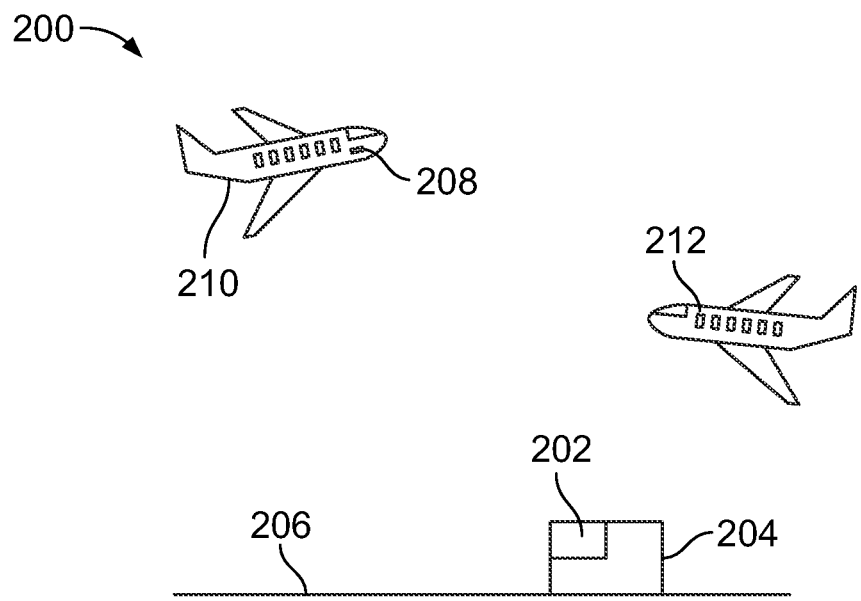
FIG. 6 illustrates a simplified schematic diagram of a bistatic radar system, according to an embodiment of the present disclosure.

FIG. 6 illustrates a simplified schematic diagram of a bistatic radar system 200, according to an embodiment of the present disclosure. The bistatic radar system 200 may include a receiver 202 positioned within a fixed structure 204, such as a building, positioned on land 206. A transmitter 208 may be secured within a first vehicle 210, such an aircraft. A second vehicle 212, such as a second aircraft, may be a target. The position of the transmitter 208 in relation to the receiver 202 may be determined as described above. Alternatively, the first and second vehicles 210 may be various other vehicles, such as land vehicles or watercraft. Also, alternatively, the receiver 202 may be positioned within a mobile structure, such as a vehicle, whether land, air, or sea based.

Figure 7:
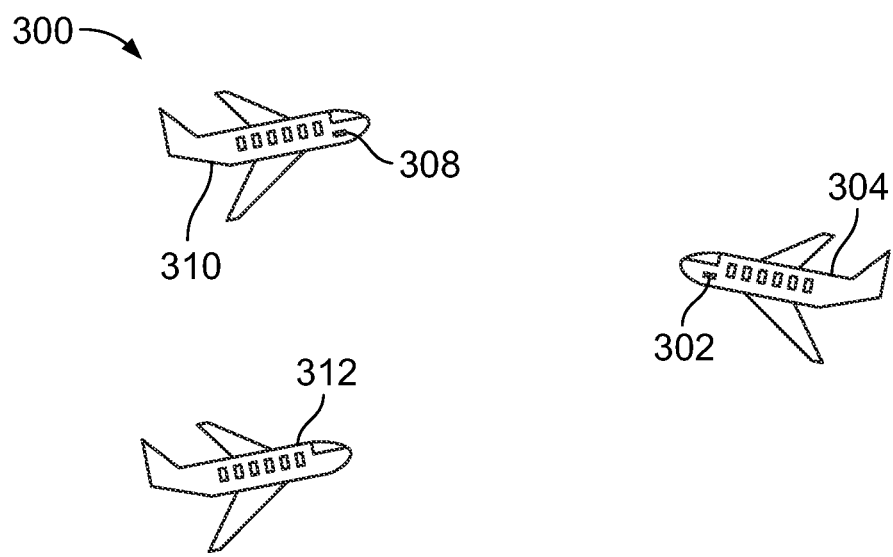
FIG. 7 illustrates a simplified schematic diagram of a bistatic radar system, according to an embodiment of the present disclosure.

FIG. 7 illustrates a simplified schematic diagram of a bistatic radar system 300, according to an embodiment of the present disclosure. The bistatic radar system 300 may include a receiver 302 positioned within a first vehicle 304, such as a first aircraft. A transmitter 308 may be secured within a second vehicle 310, such a second aircraft. A third vehicle 312, such as a third aircraft, may be a target. The position of the transmitter 308 in relation to the receiver 302 may be determined as described above. Alternatively, the first and second vehicle 210 may be various other vehicles, such as land vehicles or watercraft.

Figure 8:
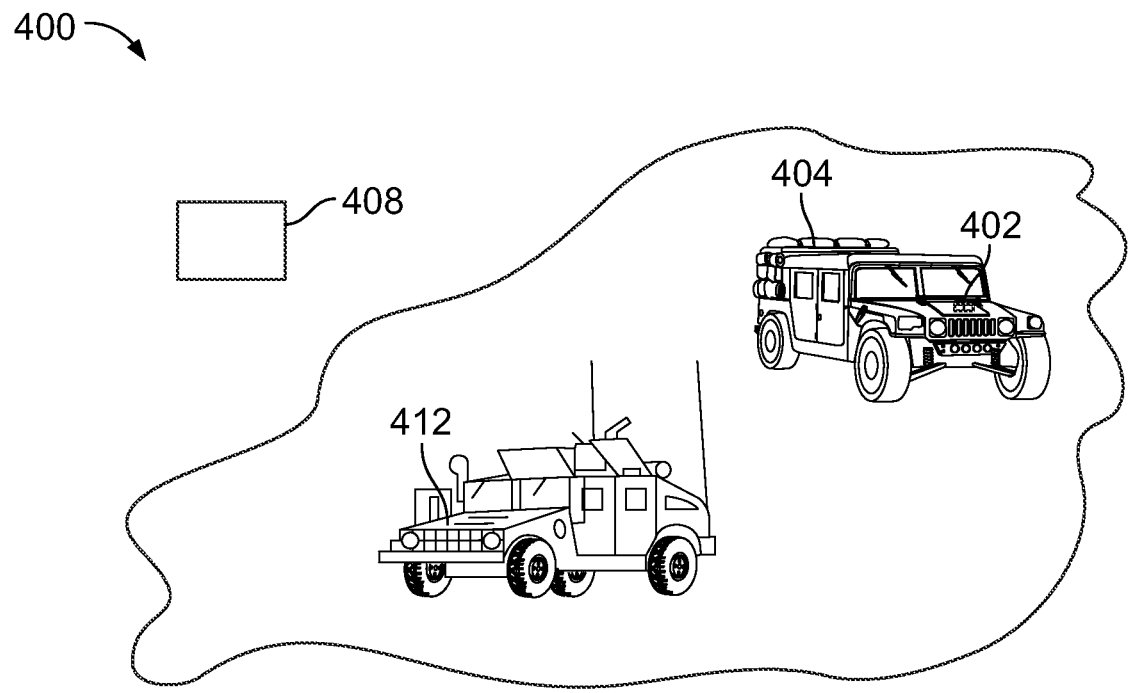
FIG. 8 illustrates a simplified schematic diagram of a bistatic radar system, according to an embodiment of the present disclosure.

FIG. 8 illustrates a simplified schematic diagram of a bistatic radar system 400, according to an embodiment of the present disclosure. The bistatic radar system 400 may include a receiver 402 positioned within a first vehicle 404, such as a first land-based vehicle. A transmitter 308 may be located within a fixed structure, such as fixed to land, suspended within or above water, or the like. Alternatively, the transmitter 308 may be secured within a vehicle, such as an aircraft, land-based vehicle, watercraft, or the like. A second vehicle 412, such as a second land-based vehicle, may be a target. The position of the transmitter 408 in relation to the receiver 402 may be determined as described above.

Figure 9:
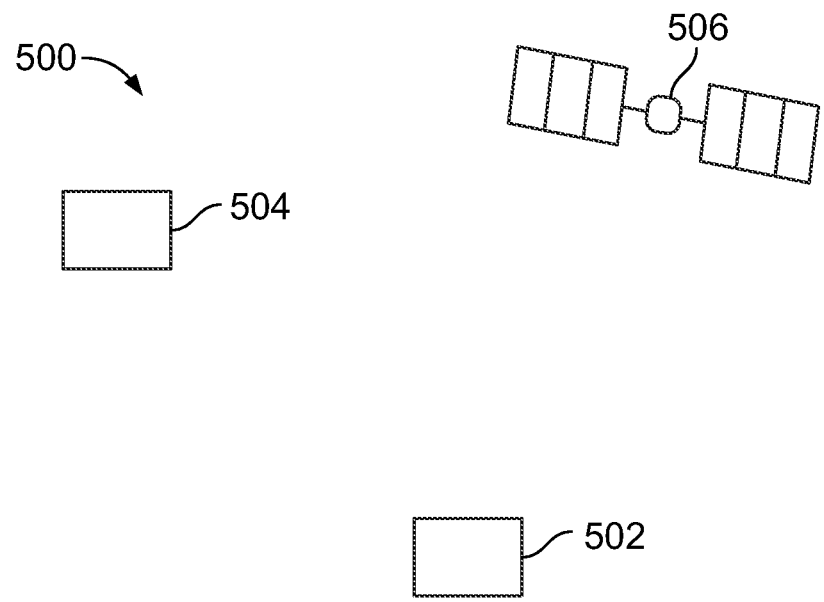
FIG. 9 illustrates a simplified schematic diagram of a bistatic radar system, according to an embodiment of the present disclosure.

FIG. 9 illustrates a simplified schematic diagram of a bistatic radar system 500, according to an embodiment of the present disclosure. The bistatic radar system 500 may include a receiver 502 and a transmitter 504, which may be fixed or mobile, as described above. A geo-synchronous satellite 506 that orbits Earth may serve as a target. The position of the transmitter 504 in relation to the receiver 502 may be determined as described above.

Figure 10:
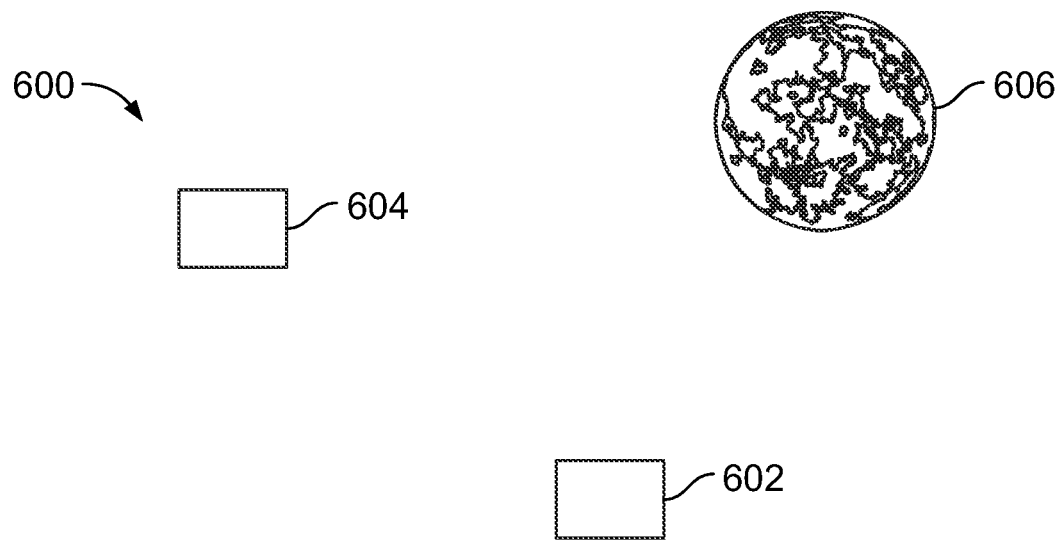
FIG. 10 illustrates a simplified schematic diagram of a bistatic radar system, according to an embodiment of the present disclosure.

FIG. 10 illustrates a simplified schematic diagram of a bistatic radar system 600, according to an embodiment of the present disclosure. The bistatic radar system 600 may include a receiver 602 and a transmitter 604, which may be fixed or mobile, as described above. The receiver 602 and the transmitter 604 may be located within the atmosphere of the Earth, or within outer space, for example. The moon 606 or another celestial body may serve as a target. The position of the transmitter 604 in relation to the receiver 602 may be determined as described above.

Figure 11:
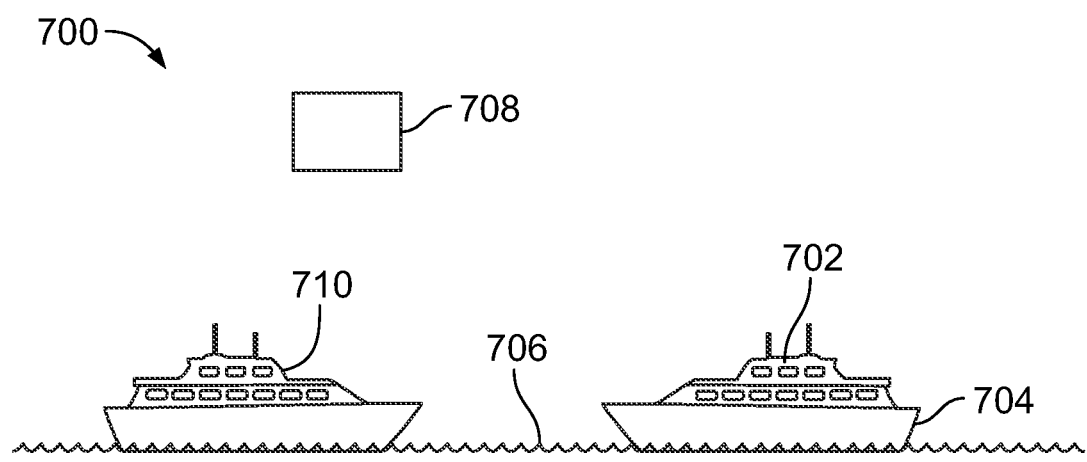
FIG. 11 illustrates a simplified schematic diagram of a bistatic radar system, according to an embodiment of the present disclosure.

FIG. 11 illustrates a simplified schematic diagram of a bistatic radar system 700, according to an embodiment of the present disclosure. The bistatic radar system 700 may include a receiver 702 onboard a ship 704 on a body of water 706. A transmitter 708 may be traveling through air, sea or land. A second ship 710 on the water 706 may serve as a target. The position of the transmitter 604 in relation to the receiver 602 may be determined as described above.

Figure 12:
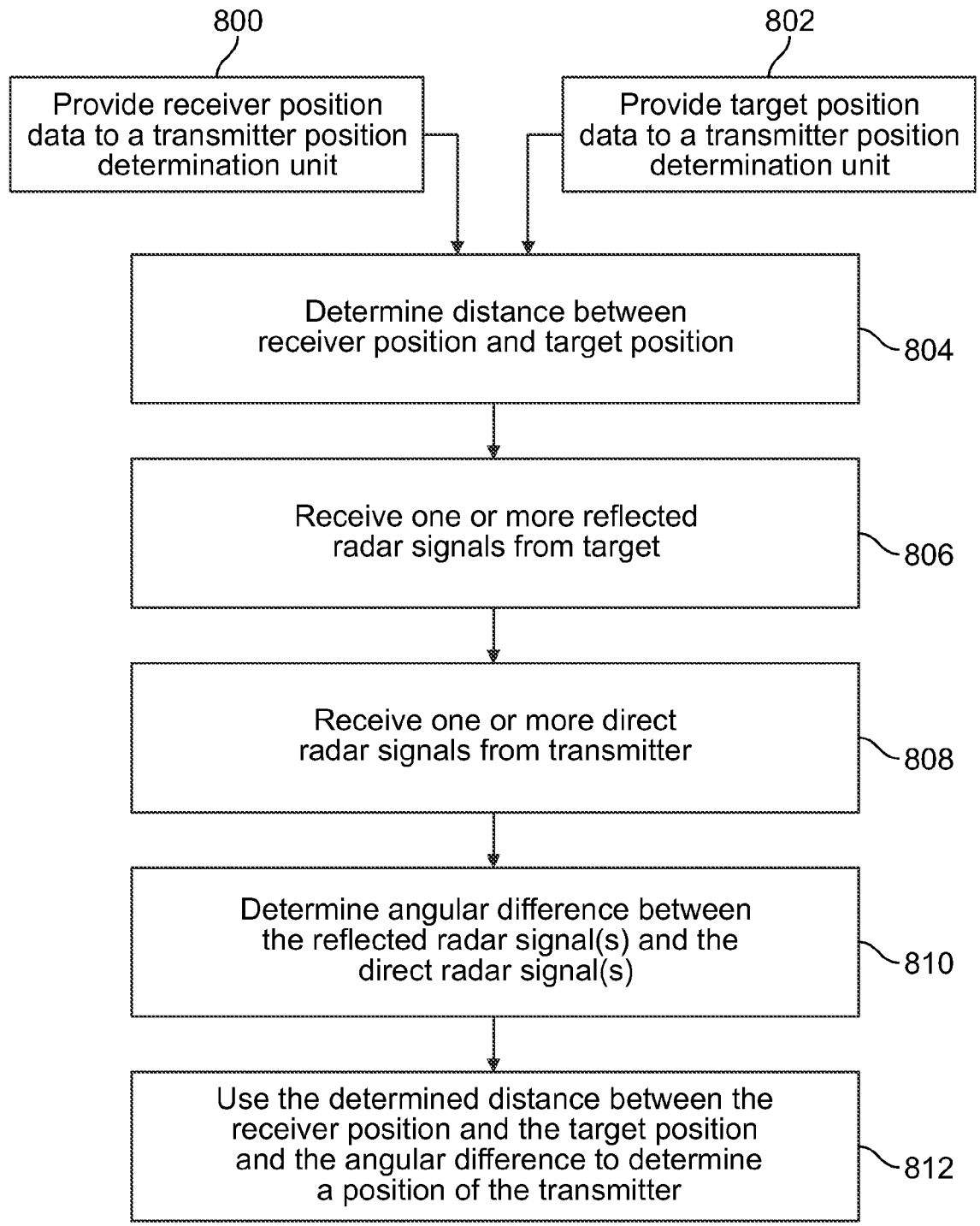
FIG. 12 illustrates a flow chart of a method of determining a position of a transmitter of a bistatic radar system, according to an embodiment of the present disclosure.

FIG. 12 illustrates a flow chart of a method of determining a position of a transmitter of a bistatic radar system, according to an embodiment of the present disclosure. At 800, receiver position data indicative of a position of a receiver is provided to a transmitter position determination unit, which may be housed within the receiver, or separate and distinct from the receiver. At 802, target position data indicative of a position of an auxiliary target is provided to the transmitter position determination unit.

At 804, the transmitter position determination unit determines a distance between the receiver position and the target position based on the received receiver position data and the target position data. For example, by knowing the positions of the receiver and the target, the transmitter position determination unit may determine the distance therebetween, such as through subtraction.

Next, at 806, the receiver receives one or more reflected radar signals (such as portions of a main beam or sidelobe(s)) from the target. The transmitter position determination unit may analyze the reflected radar signal(s). At 808, the receiver receives one or more direct or incident radar signals (such as portions of sidelobe(s) or a main beam) from the transmitter.

At 810, the transmitter position determination unit determines the angular difference between the reflected radar signal(s) and the direct radar signal(s). For example, the transmitter position determination unit may detect and analyze the angles of reception of the signals by an antenna of the receiver and determine the difference therebetween. At 812, the transmitter position determination unit uses the determined distance between the receiver position and the target position and the angular difference to determine the position of the transmitter relative to the receiver and the target.

As described above, embodiments of the present disclosure provide systems and methods of determining a position of a transmitter of a bistatic radar system. A transmitter position determination unit may determine the position of the transmitter relative to a receiver and a target based on known positions of the receiver and the target. Accordingly, while a position of the transmitter may be initially unknown, the transmitter position determination unit may determine the position of the transmitter by analyzing the positional data of the receiver and the target. The systems and methods may determine the position of the transmitter without communicating with the transmitter.

Embodiments of the present disclosure provide bistatic radar systems and methods that eliminate the need for a costly communication system between a transmitter and a receiver.

As used herein, the term "computer," "control unit," or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer," "control unit," or "module."

The computer, control unit, or processor executes a set of instructions that are stored in one or more storage elements, in order to process data. The storage elements may also store data or other information as desired or needed. The storage element may be in the form of an information source or a physical memory element within a processing machine.

The set of instructions may include various commands that instruct the computer, control unit, or processor as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

The diagrams of embodiments herein may illustrate one or more control units or modules. It is to be understood that the control units or modules represent one or more circuits, one or more circuit modules, or the like that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the modules may represent processing circuitry such as one or more field programmable gate array (FPGA), application specific integrated circuit (ASIC), microprocessor(s), a quantum computing device, and/or the like. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

The above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. §112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the clauses, and may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

What is claimed is:

1. A bistatic radar system comprising:
   a transmitter;
   a target at a first known position;
   a receiver at a second known position, wherein the receiver is configured to receive one or more reflected radar signals transmitted from the transmitter and reflected off the target, and wherein the receiver is configured to receive one or more direct radar signals transmitted from the transmitter; and
   a transmitter position determination unit configured to determine a position of the transmitter based on a determination of a distance between the first and second known positions and a determination of a first angular difference between the one or more reflected radar signals and the one or more direct radar signals that are received by the receiver.

2. The bistatic radar system of claim 1, wherein the transmitter refrains from communicating the position of the transmitter.

3. The bistatic radar system of claim 1, wherein the receiver includes the transmitter position determination unit.

4. The bistatic radar system of claim 1, wherein the transmitter position determination unit is configured to determine a bistatic range difference by measuring a time difference between a first time ($T_1$) when the one or more reflected radar signals or the one or more direct radar signals are received by the receiver and a second time ($T_2$) when the other of the one or more reflected radar signals or the one or more direct radar signals are received by the receiver.

5. The bistatic radar system of claim 4, wherein the transmitter position determination unit is configured to convert the time difference to the bistatic range difference by multiplying the time difference by the speed of light.

6. The bistatic radar system of claim 4, wherein the transmitter is separated from the target by a first linear distance ($S_1$), the transmitter is separated from the receiver by a second linear distance ($S_2$), and the receiver is separated from the transmitter by a third linear distance ($S_3$), wherein the transmitter position determination unit is configured to relate the first, second, and third distances to the first and second times as $S_1 + S_2 - S_3 = C*(T_1 - T_2)$, wherein C is the speed of light.

7. The bistatic radar system of claim 6, wherein the transmitter position determination unit is configured to determine $K = S_1 - S_3$, such that $K = C*(T_1 - T_2) - S_2$.

8. The bistatic radar system of claim 7, wherein the transmitter position determination unit is configured to determine the third distance as $S_3 = (S2^2 - K^2)/(2S_2 \cos \theta_1 + 2K)$.

9. The bistatic radar system of claim 1, wherein the transmitter position determination unit is configured to determine a second angular difference between a main beam transmitted from the transmitter towards the target and a sidelobe transmitted from the transmitter toward the receiver, and wherein the transmitter position determination unit uses the second angular difference to determine an accuracy of the determined position of the transmitter.

10. The bistatic radar system of claim 1, wherein the transmitter position determination unit is configured to determine one or both of a first elevation of the transmitter relative to the receiver or a second elevation of the target relative to the receiver.

11. The bistatic radar system of claim 1, wherein each of the transmitter, the target, and the target are moving or fixed in position.

12. A bistatic radar method comprising:
providing target position data indicative of a first position of a target to a transmitter position determination unit;
providing receiver position data indicative of a second position of a receiver to the transmitter position determination unit;
receiving, with the receiver, one or more reflected radar signals transmitted from a transmitter and reflected off the target;
receiving, with the receiver, one or more direct radar signals transmitted from the transmitter; and
determining a third position of the transmitter, with the transmitter position determination unit, based on a distance between the first and second positions and a first angular difference between the one or more reflected radar signals and the one or more direct radar signals.

13. The bistatic radar method of claim 12, further comprising refraining from communicating the third position data from the transmitter.

14. The bistatic radar method of claim 12, wherein the determining a third position comprises determining a bistatic range difference by measuring a time difference between a first time ($T_1$) when the one or more reflected radar signals or the one or more direct radar signals are received by the receiver and a second time ($T_2$) when the other of the one or more reflected radar signals or the one or more direct radar signals are received by the receiver.

15. The bistatic radar method of claim 14, wherein the determining a third position further comprises converting the time difference to the bistatic range difference by multiplying the time difference by the speed of light.

16. The bistatic radar method of claim 14, wherein the transmitter is separated from the target by a first linear distance ($S_1$), the transmitter is separated from the receiver by a second linear distance ($S_2$), and the receiver is separated from the transmitter by a third linear distance ($S_3$), wherein the determining a third position further comprises relating the first, second, and third distances to the first and second times as $S_1 + S_2 - S_3 = C*(T_1 - T_2)$, wherein C is the speed of light.

17. The bistatic radar method of claim 16, wherein the determining a third position further comprises:
determining $K = S_1 - S_3$, such that $K = C*(T_1 - T_2) - S_2$; and
determining $S_3 = (S_2^2 - K^2)/(2S_2 \cos \theta_1 + 2K)$.

18. The bistatic radar method of claim 12, further comprising:
determining a second angular difference between a main beam transmitted from the transmitter towards the target and a sidelobe transmitted from the transmitter toward the receiver,
using the second angular difference to determine an accuracy of the determined position of the transmitter.

19. The bistatic radar method of claim 12, further comprising determining one or both of a first elevation of the transmitter relative to the receiver or a second elevation of the target relative to the receiver.

20. A bistatic radar system comprising:
a transmitter position determination unit configured to determine a position of a transmitter based on a determination of a distance between first and second known positions of a target and a receiver, respectively, and a determination of a first angular difference between (a) one or more reflected radar signals reflected off the reflector and received by the receiver and (b) one or more direct radar signals directly received by the receiver.

21. The bistatic radar system of claim 20, wherein the transmitter position determination unit is configured to determine a bistatic range difference by measuring a time difference between a first time ($T_1$) when the one or more reflected radar signals or the one or more direct radar signals are received by the receiver and a second time ($T_2$) when the other of the one or more reflected radar signals or the one or more direct radar signals are received by the receiver,
wherein the transmitter is separated from the target by a first linear distance ($S_1$), the transmitter is separated from the receiver by a second linear distance ($S_2$), and the receiver is separated from the transmitter by a third linear distance ($S_3$), wherein the transmitter position determination unit is configured to relate the first, second, and third distances to the first and second times as $S_1 + S_2 - S_3 = C*(T_1 - T_2)$, wherein C is the speed of light, wherein the transmitter position determination unit is configured to determine $K=S_1-S_3$, such that $K=C*(T_1-T_2)-S_2$, and wherein the transmitter position determination unit is configured to determine the third distance as $S_3=(S2^2-K^2)/(2S_2 \cos \theta_1 +2K)$.

* * * * *